United States Patent [19]

Billings et al.

[11] 4,363,064

[45] Dec. 7, 1982

[54] OVERCURRENT PROTECTION SYSTEM

[75] Inventors: William W. Billings; James T. Mitchell, both of Lima; Richard E. Luebrecht, Wapakoneta, all of Ohio

[73] Assignee: The United States of America as represented by the Secretary of the Navy, Washington, D.C.

[21] Appl. No.: 287,005

[22] Filed: Jul. 27, 1981

[51] Int. Cl.³ .................... H02H 3/08; H02H 7/20
[52] U.S. Cl. ..................................... 361/57; 361/100; 361/55; 363/50; 363/57; 323/277
[58] Field of Search ............... 361/57, 56, 100, 54, 361/55, 93, 94–98, 86, 18; 363/50–58; 323/235, 241, 244, 277

[56] References Cited

U.S. PATENT DOCUMENTS

| | | | |
|---|---|---|---|
| 3,277,460 | 10/1966 | Heckman | 340/593 |
| 3,526,811 | 9/1970 | Shrader | 361/57 |
| 3,579,036 | 5/1971 | McCoy | 361/57 |
| 3,602,773 | 8/1971 | Bernstein . | |
| 3,697,813 | 10/1972 | Fox | 361/98 |
| 3,725,739 | 4/1973 | Griffey | 361/57 |
| 3,811,073 | 5/1974 | Shuey et al. | 361/86 |
| 3,879,652 | 4/1975 | Billings | 361/100 |
| 3,925,709 | 12/1975 | Mitchell et al. | 361/100 |
| 4,090,227 | 5/1978 | Schweitzer | 361/57 |
| 4,110,809 | 8/1978 | Cronin | 361/100 X |
| 4,156,885 | 5/1979 | Baker et al. | 361/100 |
| 4,245,184 | 1/1981 | Billings et al. | 323/235 |
| 4,245,185 | 1/1981 | Mitchell et al. | 323/235 |
| 4,309,735 | 1/1982 | Morris | 361/57 X |
| 4,336,563 | 6/1982 | Suzuki | 363/57 X |

Primary Examiner—Patrick R. Salce

[57] ABSTRACT

An overcurrent protection system adaptable for use with power controllers of the single or multi-phase ac, or dc types includes a load current sensing element in combination with an overcurrent sensing/inverse time delay circuit, a power switch and a crowbar circuit. The system also includes a drive circuit, a drive circuit input current sensor, a trip signal detector and a logic circuit. The overcurrent protection system, according to the present invention, uses the drive circuit to power the overcurrent sensing/inverse time delay circuit, to drive the power switch, and to provide a coupling path for an overcurrent fault signal across electrical isolation interface(s) thereof to the logic circuit. Thus, the need for a separate isolated power supply for powering the overcurrent sensing/inverse time delay circuit and the need for separate optical and/or electromagnetic isolation interfaces for coupling of the overcurrent fault signal are eliminated.

6 Claims, 8 Drawing Figures

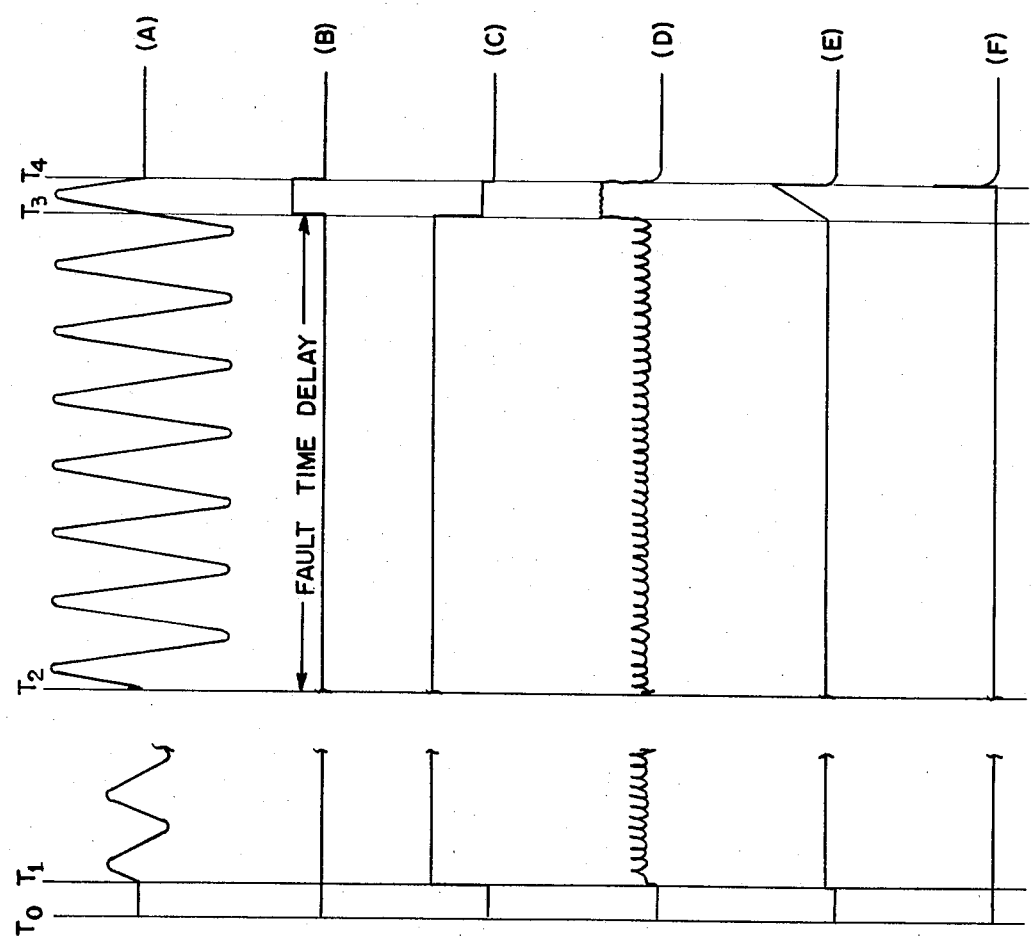

OVERCURRENT PROTECTION SYSTEM

BACKGROUND OF THE INVENTION

1. Field of the Invention

The present invention relates generally to power controllers, but more particularly to an overcurrent protection system that uses a drive circuit to power an overcurrent sensing/inverse time delay circuit, to drive a power switch, and to couple an overcurrent fault signal across electrical isolation interface(s) thereof to a logic circuit.

2. Description of the Prior Art

Electrical power systems, such as single or multi-phase ac or dc voltage types, are required to be operative over a range of conditions limited by the current handling capability of the wiring and loads. Due to cost and size consideration, it is frequently desirable to minimize the power handling capability of the system. However, for reasons of safety, it is required to provide devices for the system to determine when current levels approach an overload condition, i.e., the point at which wiring and/or components may be damaged. As an example, in electrical power systems for aircraft electrical systems, the need for minimal size and weight, accompanied by high reliability and safety, is particularly acute.

In the past, overcurrent protection systems have been used to protect the loads, wiring and/or components of electrical power systems from the consequences of faults and overloads. One such circuit is disclosed in U.S. Pat. No. 3,925,709 to Mitchell et al., filed Aug. 13, 1973, entitled, "Overcurrent Protection Circuit for AC Systems" and assigned to Westinghouse Electric Corp. Disclosed in Mitchell et al. is an overcurrent protection circuit for use with ac systems. The circuit developes a full wave dc sensing voltage whose peak magnitude is proportional to the load current of the ac system to be protected. The foregoing dc sensing voltage is then applied to an optical isolator having a secondary circuit which includes an optically responsive device having a conduction threshold voltage in a predetermined relationship to the dc sensing voltage magnitude for normal load current. The secondary circuit further includes a time delay network and a voltage level detector which, in turn are responsive to the current through the optically responsive device resulting in an overcurrent trip signal, at the output of the voltage level detector, upon the occurrence of predetermined overcurrent conditions in the load and wiring.

Previous overcurrent protection circuits, like that disclosed in Mitchell et al., and other prior art, and used in power controllers have limitations in one or more of the following areas: coupling of the overcurrent fault or trip signal from the power line to a lower potential for the logic circuits; increased power dissipation incurred by the element used to sense the load current; and/or being applicable to either ac or dc power controllers.

Consequently, there is a need in the prior art to overcome the foregoing limitations in overcurrent protection circuits and to include the improvements in a single circuit implementation.

The prior art, as indicated hereinabove, include advances in overcurrent protection circuits and systems; however, insofar as can be determined, no prior art overcurrent protection circuit or system incorporates all of the features and advantages of the present invention.

OBJECTS OF THE INVENTION

Accordingly, a principal object of the present invention is to power, via a drive circuit, an overcurrent sensing/inverse time delay circuit with the same low level dc drive voltage that is used to drive a power switch thereby minimizing the size and weight of the overcurrent protection system including eliminating the need for a separate isolated power supply for the overcurrent sensing/inverse time delay circuit.

Another object of the present invention is to crowbar the low level dc drive voltage when there is an overcurrent fault signal from the overcurrent sensing/inverse time delay circuit in an improved manner.

Yet another object of the present invention is to detect the crowbarring of the low level dc drive voltage, manifested by an increase in drive current to a drive circuit input current sensor, thereby effectively providing a coupling path for the overcurrent fault signal across electrical isolation interface(s) of the drive circuit, thus, eliminating the need for optical and/or electromagnetic isolation interface(s) for the coupling of the overcurrent fault signal.

A further object of the present invention is to configure an overcurrent protection system adaptable for use with power controllers of the single or multi-phase ac, or dc types.

SUMMARY OF THE INVENTION

In accordance with the above stated objects, other objects, features and advantages, the present invention has as a combined primary purpose to use a drive circuit to power an overcurrent sensing/inverse time delay circuit, to drive a power switch, and to couple an overcurrent fault signal across electrical isolation interface(s) thereof to a logic circuit which de-energizes the drive circuit. The foregoing action protects against overcurrents in the system wiring and load.

The essence of the present invention is in the powering of the overcurrent sensing/inverse time delay circuit with the same low level dc drive voltage that is used to drive the power switch in the crowbarring of this low level dc drive voltage during an overload condition, in the detection of the shorting condition, and in the subsequent turning off of the low level dc drive voltage which removes power from the load.

The purpose of the present invention is carried out by an overcurrent protection system adaptable for use with power controllers of the single or multi-phase ac or dc types. The system includes a load current sensing element in combination with an overcurrent sensing/inverse time delay circuit, a power switch and a crowbar circuit. The system also includes a drive circuit, a drive circuit input current sensor, a trip signal detector and a logic circuit.

BRIEF DESCRIPTION OF THE DRAWINGS

The previously stated objects, other objects, features and advantages of the present invention will be apparent from the following more particular description of the preferred embodiment as illustrated in the accompanying drawings, in which:

FIG. 3 is a timing diagram depicting waveforms illustrative of the operation of the overcurrent protection system of FIGS. 1 and 2.

DESCRIPTION OF THE PREFERRED EMBODIMENT

Figure 1:
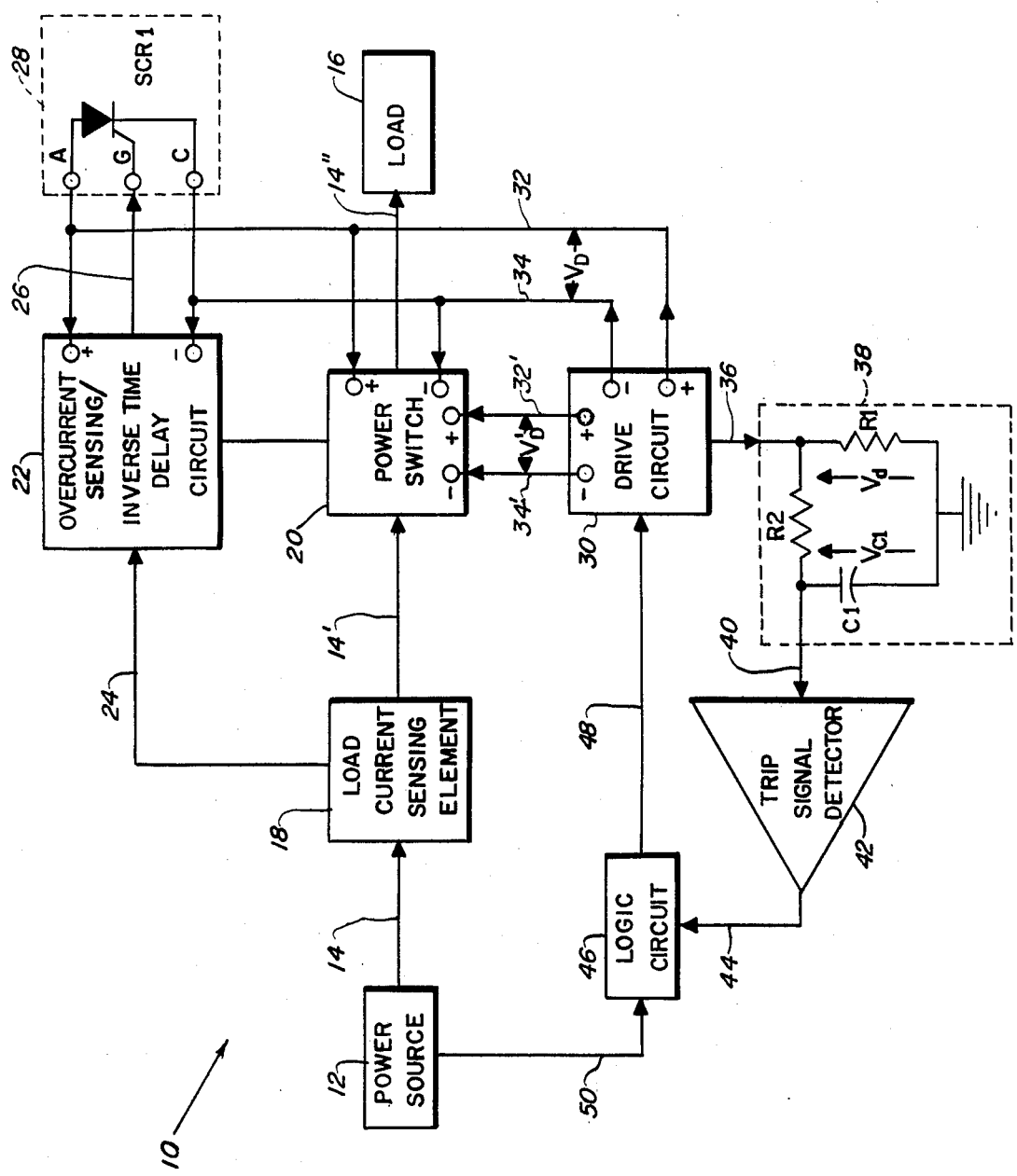
FIG. 1 is a general block diagram and schematic representation of the overcurrent protection system depicting the arrangement of the various sub-systems and their interconnects according to the present invention.

FIG. 1 shows an embodiment of an overcurrent protection system in which the present invention is employed to protect against an overcurrent condition by developing, in response thereto, an overcurrent fault signal which is an inverse time delayed signal that appears sooner for heavier overloads and later for lighter overloads. Basically, overcurrent protection system 10 controls the power from a power source 12 via load current lines 14, 14' and 14" to a load 16 such that overload fault conditions are sensed rapidly to protect the aforementioned lines and load. Overcurrent protection system 10 includes a load current sensing element 18 which is operatively connected to power source 12 via load current line 14, to a power switch 20 via load current line 14', and to an overcurrent sensing/inverse time delay circuit 22 via an overcurrent sensing line 24. Power switch 20 is operatively connected to load 16 via load current line 14".

For purposes of the present invention, load current sensing element 18 provides a low-level overcurrent sensing voltage at overcurrent sensing line 24 that is proportional to the load current in load current lines 14, 14' and 14". Thus, load current sensing element 18 may be implemented in the form of a shunt resistance for power source 12 being ac or dc, a transductor for power source 12 being dc, or a current transformer for power source 12 being ac. Also, for purposes of the present invention, overcurrent sensing/inverse time delay circuit 22 may be implemented in the form of an electronic circuit that operates on the overcurrent sensing voltage to generate an overcurrent fault signal at overcurrent fault signal line 26 when the load current reaches a predetermined overload level. In addition, the overcurrent fault signal generated is an inverse time delayed signal, i.e., it appears sooner for heavier overloads and later for lighter overloads.

Still referring to FIG. 1, overcurrent fault signal line 26 is operatively connected to a crowbar circuit 28 at a terminal G thereof. Positive and negative terminals of overcurrent sensing/inverse time delay circuit 22 are also connected operatively to crowbar circuit 28 at terminals A and C, respectively. These aforementioned positive and negative terminals are also operatively connected to corresponding positive and negative terminals of power switch 20 and a drive circuit 30. These positive and negative terminals are connected together via positive drive line 32 and negative drive line 34, respectively. Likewise, addition positive and negative terminals of power switch 20 and drive circuit 30 are connected together via positive drive line 32' and negative drive line 34', respectively. As shown, the drive voltages from drive circuit 30, as measured between the aforementioned pairs of lines, are $V_D$ and $V'_D$, respectively.

Referring further to FIG. 1, drive circuit 30 via an input current sensor line 36 is operatively connected to a drive circuit input current sensor 38. This circuit, in turn, is operatively connected via a trip signal threshold line 40 to a trip signal detector 42. The output of trip signal detector 42 is, via overcurrent trip signal line 44, operatively connected to a logic circuit 46. As shown, logic circuit 46, via a drive circuit input line 48, is operatively connected to drive circuit 30, aforementioned. An ac signal on zero crossing voltage line 50 in the case when power source 12 is an ac voltage source causes logic circuit 46 to generate an input drive signal on drive circuit input line 48 corresponding to instances when the voltage potential of power source 12 goes through "0" voltage potential, i.e., either the 0° or 180° point in the voltage waveform.

For purposes of the present invention, and as illustrated in FIG. 1, crowbar circuit 28 is preferably a silicon controlled rectifier SCR1. Power switch 20 which controls the flow of power to load 16, and, in turn, is controlled by drive circuit 30, is in reality a contactless solid state switching device. This type of device interfaces power source 12 with load 16 and vice versa in a precise manner, providing thereby, soft, benign turn-on/turn-off and fault remove operations. For dc applications, power switch 20 would be implemented with bipolar or field-effect transistors, while for ac applications it would be implemented with silicon controlled rectifiers or transistors combined therewith. Drive circuit 30, as aforementioned, is controlled and precisely timed, in turn-on and turn-off by logic circuit 46 in response to the absence or presence of the overcurrent condition at overcurrent trip signal line 44. The drive voltages $V_D$ and $V'_D$, as shown, at the positive and negative terminals of drive circuit 30 are amplified and electrically isolated from power switch 20 and the low level logic signal received from logic circuit 46 at drive circuit input line 48.

Figure 2:
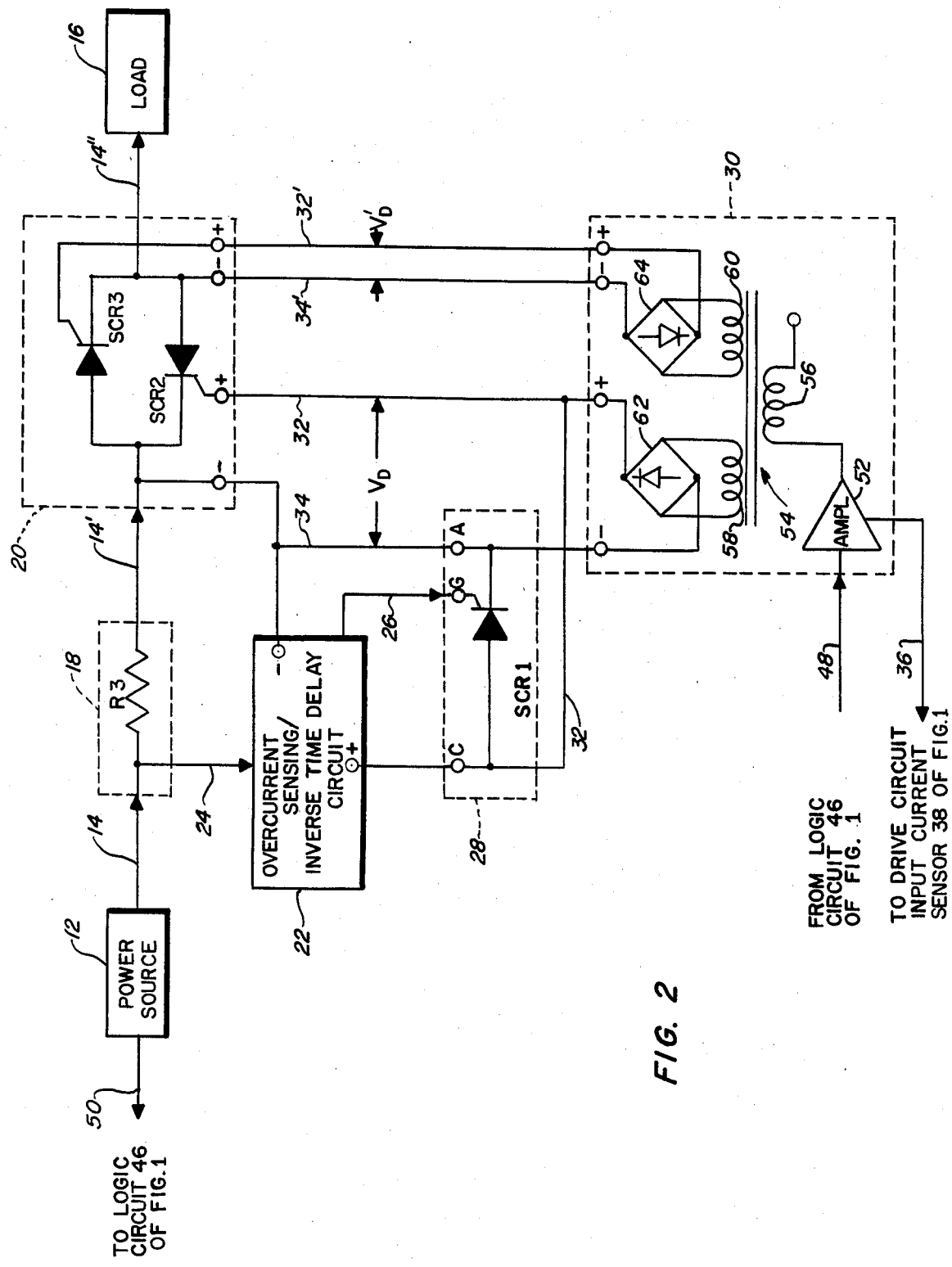
FIG. 2 is a specific block diagram and schematic representation of an exemplary circuit according to the general block diagram and schematic of FIG. 1.

FIG. 2 shows an exemplary circuit using a resistor-shunt-element for load current sensing element 18, silicon controlled rectifiers (SCR2, SCR3) for power switch 20 and a high frequency drive transformer type implementation for drive circuit 30. Thus, drive circuit 30 includes an amplifier 52 operatively connected at its input to drive circuit input line 48. One output of amplifier 52 is connected to drive circuit input current sensor 38 via input current sensor line 36. Another output of amplifier 52 is operatively connected to a drive transformer 54, via one end of a primary winding 56, the other end being connected to a dc voltage supply. Drive transformer 54 includes a secondary winding 58, and another secondary winding 60. Bridge rectifiers 62 and 64 are operatively connected across secondary windings 58 and 60, respectively. Filter circuits (not shown) can be used to filter the drive voltages $V_D$ and $V'_D$. As shown, two electrically isolated outputs, of drive circuit 30, $V_D$, $V'_D$, are required to drive SCR2 and SCR3. This is necessary, with the circuit implementation shown, because the gate circuit of SCR2 interfaces with power input at load current line 14' and the gate circuit of SCR3 interfaces with the power output at load current line 14". The voltage $V_D$, besides causing SCR2 to conduct, also powers overcurrent sensing/inverse time delay circuit 22. Consequently, if an overcurrent fault signal occurs (in response to an overload condition) SCR1 of crowbar circuit 28 will conduct thereby crowbarring voltage $V_D$ with the operational results described in the "Statement of the Operation" hereintofollow.

STATEMENT OF THE OPERATION

Details of the operation, according to the present invention, are explained in conjunction with FIGS. 1, 2 and 3 viewed concurrently.

Referring now to FIGS. 1 and 2 and the timing diagram of FIG. 3, at turn-on at a time $T=T_1$, load 16 is energized via operatively connected logic circuit 46 driving drive circuit 30, which in turn, drives power switch 20 and powers overcurrent sensing/inverse time delay circuit 22. Thus, a normal load current (or voltage) occurs as shown in FIG. 3-A.

At a later time $T=T_2$, an overcurrent fault condition occurs as shown by the load current increase in FIG. 3-A. The corresponding increase in the overcurrent sensing voltage at overcurrent sensing line 24 causes the operation of overcurrent sensing/inverse time delay circuit 22, and the subsequent occurrence (after a time delay which is shorter for heavier overloads and is longer for lighter overloads) of an overcurrent fault signal on overcurrent fault signal line 26 at a time $T=T_3$ as shown in FIG. 3-B. The application of the overcurrent fault signal to the gate (terminal G) of SCR1 causes it to conduct. Accordingly, since the anode and cathode (terminals A and C) of SCR1 are operatively connected across positive drive line 32 and negative drive line 34, the aforementioned conduction causes a crowbarring or shorting out of the output drive voltage $V_D$ as shown in 3-C. By mutual coupling, output drive voltage $V'_D$ is also shorted out. With the $V_D$ and $V'_D$ outputs of drive circuit 30 shorted, there is a consequential increase in the input drive current. This increase in input drive current, reflected in input current sensor line 36, affects a subsequent increase in the input current sensor voltage $V_d$ across R1 of drive circuit input current sensor 38, as shown in FIG. 3-D, and, accordingly, in the output voltage $V_{C1}$ thereof as shown in FIG. 3-E. This output voltage $V_{C1}$ is in response to the manner in which the $V_d$ voltage is filtered in the R1, R2 and C1 network of drive circuit input current sensor 38. This output voltage $V_{C1}$ is then applied as the input voltage, i.e., trip signal to trip signal detector 42, which for purposes of the invention can be a comparator or threshold detector which has a threshold or trip value of about twice the normal operating voltage at trip signal threshold line 40.

At a still later time $T=T_4$, when the voltage $V_{C1}$ exceeds the threshold level at the input of trip signal detector 42, an overcurrent trip signal occurs at overcurrent trip signal line 44, as shown in FIG. 3-F. This overcurrent trip signal causes logic circuit 46 which is normally in an "on" mode, to prevent to a "tripped" mode of operation thereby removing the drive signal at drive circuit input 48, drive circuit 30. The foregoing action deactivates drive circuit 30 until logic circuit 46 is reset automatically or manually depending on the particular application of the present invention. For purposes of the present invention, the input drive signal from logic circuit 46 on drive circuit input line 48 is at least 3.4 Khz, but can be lower depending again on the particular application of the present invention.

To those skilled in the art, many modifications and variations of the present invention are possible in light of the above teachings. It is therefore to be understood that the present invention can be practiced otherwise than as specifically described herein and still be within the spirit and scope of the appended claims.

What is claimed as new and desired to be secured by Letters Patent of the United States is:

1. An improved overcurrent protection system having a power source of single or multi-phase ac, or dc, a load current sensing element for generating an overcurrent sensing voltage that is proportional to a load voltage across a load, a power switch for controlling the flow of load current, via a load current line connected to the load, an overcurrent sensing/inverse time delay circuit for sensing the overcurrent sensing voltage to generate an overcurrent fault signal in response to an overload condition, the overcurrent fault signal being generated sooner for heavier overloads and later for lighter overloads, and a logic circuit operative, under a normal load condition, to generate an input drive voltage at a drive circuit input line and under an overload condition, and in response to an overcurrent trip signal at its input, said logic circuit operates to turn-off the input drive voltage, wherein the improvement comprises:

a drive circuit operatively connected at its input, via the drive circuit input line, to said logic circuit, operatively connected at a first output to said power switch and said overcurrent sensing/inverse time delay circuit, and operatively connected at a second output to said power switch, said drive circuit operating on the input drive voltage at its input to generate first and second drive voltages at the first and second outputs thereof;

a drive circuit input current sensor operatively connected at its input to a third output of said drive circuit for generating a filtered voltage at its output that is proportionate to the voltage at its input;

a trip signal detector operatively connected in its input to the output of said drive circuit input current sensor, and operatively connected at its output to the input of said logic circuit; and a crowbar circuit operatively connected to said overcurrent sensing/inverse time delay circuit, said power switch and said drive circuit, such that when the overload condition occurs, the corresponding increase in the overcurrent sensing voltage causes said overcurrent sensing/inverse time delay circuit at the appropriate time to generate the overcurrent fault signal causing said crowbar circuit to conduct, thereby causing the crowbarring of the first drive voltage across the first output of said drive circuit which causes said overcurrent sensing/inverse time delay circuit to turn-off, and due to the shorting of the first output of said drive circuit, a consequential increase in the voltage at the input of said drive voltage input current sensor, this increase affecting a subsequent increase in the output voltage of said drive circuit input current sensor, as applied to the input of said trip signal detector, which generates an overcurrent trip signal at its output when the voltage at its input exceeds a threshold level, thereby causing said logic circuit to remove the input drive voltage to said drive circuit causing it to deactivate.

2. The improved overcurrent protection system according to claim 1 wherein said drive circuit comprises:

an amplifier having an input corresponding to the input of said drive circuit, a first output, and a second output corresponding to the third output of said drive circuit, for amplifying the input drive voltage at its input, and for responding at its second output with a consequential increase in voltage when said crowbar circuit conducts;

a drive transformer having a primary winding operatively connected to the first output of said amplifier, a first secondary winding corresponding to the first output of said drive circuit, and a second secondary winding corresponding to the second output of said drive circuit;

a first bridge rectifier operatively connected across said first secondary winding of said drive transformer; and a second bridge rectifier operatively connected across said second secondary winding of said drive transformer.

3. The improved overcurrent protection system according to claim 1 wherein said drive circuit input current sensor comprises:

a first resistor operatively connected at one end to the input of said drive circuit input current sensor and to the third output of said drive circuit, and at the other end to ground;

a second resistor operatively connected at one end to the input of said drive circuit input current sensor and to the third output of said drive circuit, and at the other end to the output of said drive circuit input current sensor; and a capacitor operatively connected at one end to the output of said drive circuit input current sensor, and at the other end to ground.

4. The improved overcurrent protection system according to claim 1 wherein said crowbar circuit is a silicon controlled rectifier having its gate driven by the overcurrent fault signal.

5. The improved overcurrent protection system according to claim 1 wherein for ac operation, said power switch comprises dual silicon controlled rectifiers connected in a reverse parallel relationship between the load and said load current sensing element.

6. The improved overcurrent protection system according to claim 1 wherein said load current sensing element comprises a resistor connected in series with the load current line between said power source and said power switch and in parallel with the input of said overcurrent sensing/inverse time delay circuit for generating the overcurrent sensing voltage.

* * * * *